US012572116B2

(12) United States Patent
Di Domenico et al.

(10) Patent No.: US 12,572,116 B2
(45) Date of Patent: Mar. 10, 2026

(54) REGULATING HOROLOGICAL MEMBER WITH FLEXIBLE GUIDE PROVIDED WITH TEMPERATURE-COMPENSATION MEANS

(71) Applicant: The Swatch Group Research and Development Ltd, Marin (CH)

(72) Inventors: Gianni Di Domenico, Neuchâtel (CH); Baptiste Hinaux, Lausanne (CH); Mohammad Hussein Kahrobaiyan, Boudevilliers (CH); Jean-Luc Helfer, Le Landeron (CH); Pascal Winkler, St-Blaise (CH)

(73) Assignee: The Swatch Group Research and Development Ltd, Marin (CH)

( * ) Notice: Subject to any disclaimer, the term of this patent is extended or adjusted under 35 U.S.C. 154(b) by 311 days.

(21) Appl. No.: 18/348,853

(22) Filed: Jul. 7, 2023

(65) Prior Publication Data

US 2024/0027967 A1 Jan. 25, 2024

(30) Foreign Application Priority Data

Jul. 21, 2022 (EP) .................................... 22186291

(51) Int. Cl.
*G04B 17/22* (2006.01)
*G04B 17/04* (2006.01)

(52) U.S. Cl.
CPC ........... *G04B 17/22* (2013.01); *G04B 17/045* (2013.01)

(58) Field of Classification Search
CPC .............................. G04B 17/22; G04B 17/045
See application file for complete search history.

(56) References Cited

U.S. PATENT DOCUMENTS

| | | | | |
|---|---|---|---|---|
| 11,454,932 B2 * | 9/2022 | Di Domenico | ........ | G04B 31/06 |
| 2019/0032644 A1 * | 1/2019 | Winkler | ................. | G04B 17/26 |
| 2022/0197218 A1 * | 6/2022 | Kahrobaiyan | ....... | G04B 17/045 |
| 2024/0310784 A1 * | 9/2024 | Colpo | .................. | G04B 18/006 |

FOREIGN PATENT DOCUMENTS

| | | |
|---|---|---|
| CH | 716 434 A2 | 1/2021 |
| CH | 716 725 A2 | 4/2021 |

OTHER PUBLICATIONS

European Search Report issued Nov. 3, 2022 in European Application 22186291.5 filed Jul. 21, 2022 3 pages (with English Translation of Category of cited documents).

* cited by examiner

*Primary Examiner* — Sean Kayes
(74) *Attorney, Agent, or Firm* — Oblon, McClelland, Maier & Neustadt, L.L.P.

(57) ABSTRACT

A member for a horological movement including an oscillating mass, for example a balance, a flexible guide including at least two main flexible blades connecting a movable support to the oscillating mass to enable the oscillating mass to make a rotary movement about a virtual pivot, wherein the regulating member includes an elastic device for compensating for the temperature arranged so as to connect the movable support to a securing device for securing the regulating member on the horological movement, the elastic compensation device being configured to adapt its stiffness according to the temperature in order to compensate for the effect of temperature on the regulating member.

18 Claims, 1 Drawing Sheet

REGULATING HOROLOGICAL MEMBER WITH FLEXIBLE GUIDE PROVIDED WITH TEMPERATURE-COMPENSATION MEANS

CROSS-REFERENCE TO RELATED APPLICATION

This application claims priority to European Patent Application No. 22186291.5 filed on Jul. 21, 2022, the entire disclosure of which is hereby incorporated herein by reference.

TECHNICAL FIELD OF THE INVENTION

The invention relates to a regulating horological member with flexible guide provided with temperature-compensation means.

TECHNOLOGICAL BACKGROUND

Most mechanical watches today are equipped with a balance spring and a Swiss lever escapement mechanism. The balance spring constitutes the time base of the watch. It is also referred to as a resonator or regulating member.

As for the escapement, this fulfils two main functions:

maintaining the to-and-fro motions of the resonator;

counting these to-and-fro motions.

An inertial element, a guide and an elastic return element are required in order to constitute a regulating member. Conventionally, a spiral spring acts as an elastic return element for the inertial element formed by a balance. This balance is guided rotationally by pivots, which generally turn in ruby plain bearings.

At the present time flexible guides are used as an elastic return spring to form a virtual pivot. Flexible guides with virtual pivot make it possible to substantially improve horological resonators. The simplest are crossed blade guides, composed of two guide devices with straight blades that cross, in general perpendicularly. These two blades may be either three-dimensional in two different planes, or two-dimensional in the same plane and are then welded at their crossing point. However, RCC (Remote Centre Compliance) type non-crossed blade guides, which have non-crossed straight blades, also exist. Such a resonator is described in the document EP 2911012, or in the documents EP14199039 and EP16155039.

However, such a mechanical resonator, while it is operating, may be subjected to disturbances caused by changes in external parameters, which give rise to variations in frequency of the resonator. These parameters are for example the temperature, pressure, humidity or gravity. The variation in frequency of the resonator results in an error in the measurement of time.

The document CH 704687 describes a regulating member comprising a spiral spring and a member for correcting the position of the balance-spring stud to correct the deformations of the spiral spring due to certain parameters, such as the temperature.

Nevertheless, not only is such a correction member not easily adaptable to flexible guides, but furthermore it does not achieve the required level of precision.

SUMMARY OF THE INVENTION

The purpose of the present invention is to overcome all or some of the aforementioned drawbacks by proposing a horological regulating member with flexible guide provided with precise means for compensating for temperature, adaptable to flexible guides.

For this purpose, the invention relates to a horological regulating member for a horological movement comprising an oscillating mass, for example a balance, a flexible guide comprising at least two main flexible blades connecting a movable support to the oscillating mass to enable the oscillating mass to make a rotary movement about a virtual pivot.

The invention is remarkable in that the regulating member comprises an elastic device for compensating for the temperature arranged so as to connect the support to means for securing the regulating member on the horological movement, the elastic compensation device being configured to adapt its stiffness according to the temperature in order to compensate for the effect of temperature on the regulating member.

By means of the invention, the prestressing means exert a variable force or torque on the elastic element according to the temperature, so that the regulating member substantially keeps precise running despite significant changes in the temperature. This is because, when the temperature changes, the prestressing means modify the force or torque exerted on the elastic element, so that the stiffness of the flexible guide is modified. By modifying the stiffness of the flexible guide, the running of the regulating member is adjusted. Consequently, when the temperature changes, the elastic device is mechanically impacted to adjust the running of the regulating member to this change.

This elastic element modifies the rigidity of the attachment point and provides additional flexibility to the resonator. Thus, the effective rigidity of the resonator comprises the rigidity of the flexible guide and the rigidity of the elastic element. The force or the variable torque makes it possible to prestress the elastic element, preferably without prestressing the flexible guide and without moving the end of the flexible guide. By prestressing the elastic element, the rigidity thereof changes, while the rigidity of the flexible guide remains unchanged, since it is not prestressed and the end thereof does not move.

By changing the rigidity of the elastic element, the rigidity of the resonator (rigidity of the flexible guide and rigidity of the elastic element) changes, which consequently modifies the running of the resonator. The elastic element preferably being more rigid than the flexible guide, the share of the flexibility of the elastic element in the overall rigidity is less than that of the flexible guide. Consequently, a change to the rigidity of the flexible element changes the rigidity of the whole of the resonator, and consequently regulates its running finely, which makes it possible to precisely adjust the frequency of our time base. In this way great precision is obtained in the maintenance of the running according to the temperature.

According to a particular embodiment of the invention, the elastic compensation device comprises an elastic element arranged between the support and the securing means, as well as prestressing means for applying a variable force or torque on the elastic element according to the temperature.

According to a particular embodiment of the invention, the prestressing means comprise a spring part connected to the movable support, the spring part transmitting the force or torque to the elastic element by means of the movable support, the spring part, the movable support and the elastic element being arranged on the same axis.

According to a particular embodiment of the invention, the prestressing means comprise a body that is deformable according to the temperature, the deformable body being at least partly in contact with the spring part.

According to a particular embodiment of the invention, the deformable body is an elongate bimetallic strip.

According to a particular embodiment of the invention, the spring part comprises a first flexible blade connected to the movable support.

According to a particular embodiment of the invention, the spring part comprises a first translation table connected to the first flexible blade.

According to a particular embodiment of the invention, the deformable body is in contact with the first translation table.

According to a particular embodiment of the invention, the spring part comprises a spring arranged between the deformable body and the first translation table.

According to a particular embodiment of the invention, the first translation table comprises a first movable element connected to the first flexible blade.

According to a particular embodiment of the invention, the elastic part comprises a first movable element connected to the first flexible blade, a second movable element, and a second flexible blade connected to the thermally deformable body, the first movable element and the second movable element being connected by a pair of parallel flexible blades.

According to a particular embodiment of the invention, the elastic part comprises a second flexible blade connected to the thermally deformable body and to the second movable element.

According to a particular embodiment of the invention, the regulating member comprises means for regulating the prestressing means to apply a variable force on the prestressing means, for example on the first elongate movable element.

According to a particular embodiment of the invention, the regulating means comprise a second translation table arranged at one end of the deformable body, the variable force being applied to the second translation table.

According to a particular embodiment of the invention, the two main blades of the flexible guide are crossed.

According to a specific embodiment of the invention, the regulating member extends substantially in the same plane, except for the oscillating mass.

According to one specific embodiment of the invention, the elastic element comprises a pair of non-crossed blades connecting the support to the securing means.

The invention further relates to a horological movement including such a regulating member.

BRIEF DESCRIPTION OF THE FIGURES

The aims, advantages and features of the present invention will appear upon reading several embodiments given only as non-limiting examples, with reference to the appended drawings wherein.

DETAILED DESCRIPTION OF THE INVENTION

Figure 1:
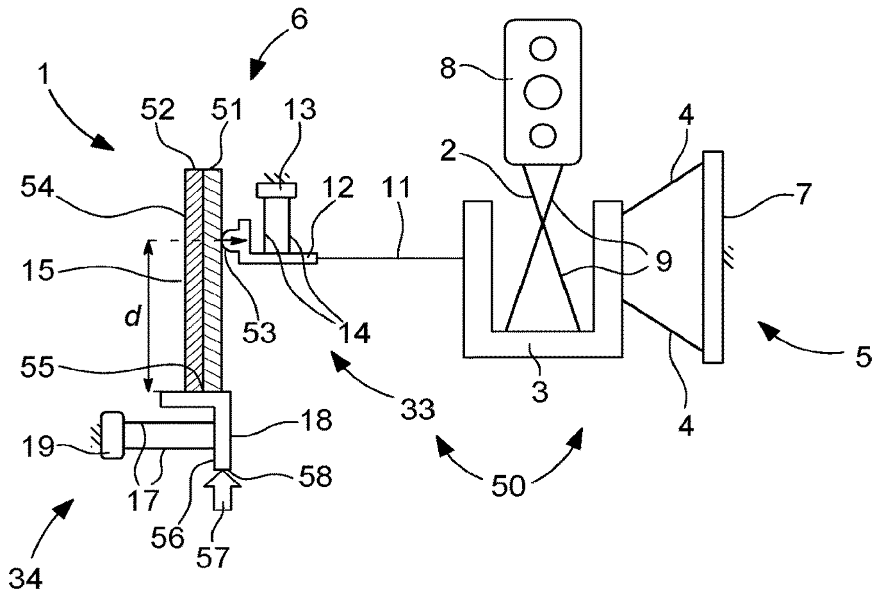
FIG. 1 schematically represents a plan view of a regulating member provided with means for compensating for temperature according to a first embodiment of the invention, FIG. 2 schematically represents a plan view of a regulating member provided with means for compensating for temperature according to a second embodiment of the invention, and FIG. 3 schematically represents a plan view of a regulating member provided with means for compensating for temperature according to a third embodiment of the invention.
Figure 2:
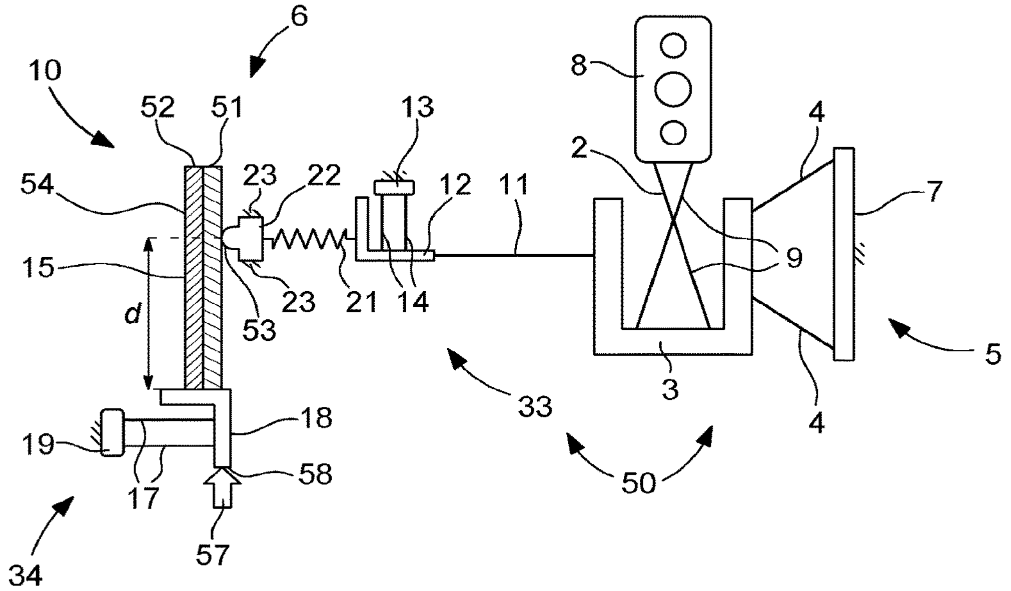
Figure 3:
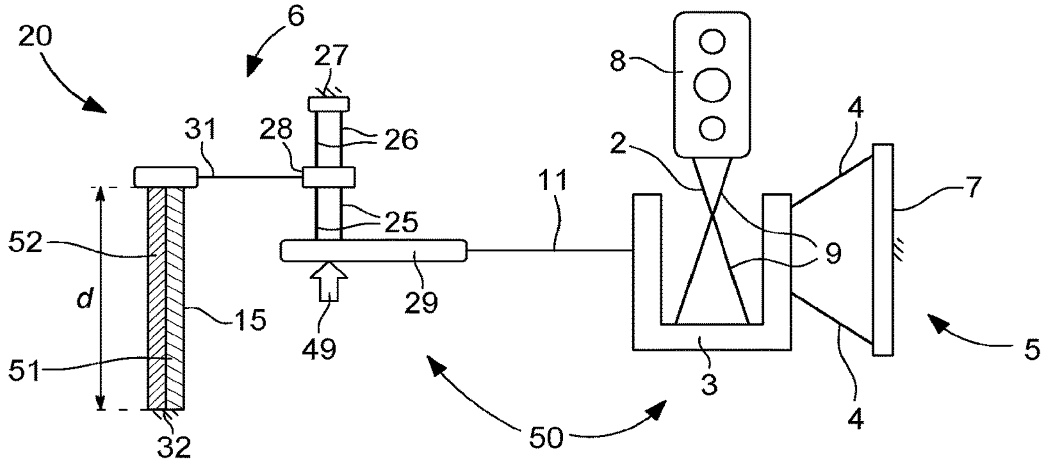

FIGS. 1 to 3 show three embodiments of a regulating member 1, 10, 20 according to the invention, the regulating member 1, 10, 20 comprising an elastic device 50 configured to compensate for a thermal variation exerted on the regulating member 1, 10, 20. Such regulating members 1, 10, 20 are intended to be arranged in a horological movement to regulate it.

In the three embodiments in FIGS. 1 to 3, the regulating member 1, 10, 20 comprises a flexible guide 2 and an oscillating mass, for example an annular balance or a member in the shape of a bone comprising a main arm and two ends extending on each side of the central arm, the oscillating mass not being shown on the figures.

Preferably, the regulating member 1, 10, 20 extends substantially in the same plane, except for the oscillating mass, which oscillates in a parallel plane, preferably above the flexible guide 2.

The flexible guide 2 comprises two main flexible blades 9, and a rigid support 3. The flexible guide extends along an axis of symmetry substantially perpendicular to the main axis of the regulating member 1, 10, The flexible blades 9 are joined firstly to the rigid support 3 of the flexible guide 2 and secondly to the fastener 8 intended to associate the oscillating mass. The two main blades 9 of the flexible guide 2 are crossed, preferably straight and of the same length.

The rigid support 3 has a U shape, the main flexible blades 2 being connected to the inside of the base of the U, and extending outside the U as far as the fastener 8.

According to the invention, the regulating member 1, 10, 20 comprises an elastic device 50 for compensating for the temperature, the elastic device being arranged on either side of the rigid support 3 so as to connect the rigid support 3 to means 7 for securing the regulating member 1, 10, 20 on the horological movement. The securing means 7 are for example an elongate body intended to be assembled on the plate.

The elastic compensation device 50 is configured for adapting its stiffness according to the temperature in order to compensate for the effect of temperature on the regulating member 1, 10, 20. The elastic compensation device 50 preferably has a stiffness greater than the crossed main flexible blades 9.

The elastic compensation device 50 comprises an elastic element arranged between the rigid support 3 and the securing means 7, as well as prestressing means 6 for applying a variable force or torque on the elastic element 5 and the rigid support 3 according to the temperature.

The elastic element 5 comprises a pair of non-crossed blades 4 connecting the rigid support 3 to the securing means 7. The elastic element is connected to a first external side of the U and extends perpendicularly to the flexible guide 2. The non-crossed blades 4 extend from the rigid support 3 to the securing means 7 while moving away from each other.

The prestressing means 6 comprise a spring part provided with a flexible blade 11 connected to the second external side of the U. The first flexible blade 11 extend perpendicularly to the flexible guide 2.

In the first embodiment of FIG. 1, the spring part of the prestressing means 6 comprises a first translation table 33 provided with a first movable element 12 in an L shape and a second support 13 immobile with respect to the plate of the movement. The first movable element 12 is connected to the flexible blade 11 by an end of a first arm of the L. The second arm of the L includes a protrusion 53 rounded on the external side. Furthermore, the first translation table 33 comprises a pair of parallel blades 14, connecting the interior of the first arm of the L to the second immobile support 13. Thus the first movable element 12 is guided by the parallel blades 14, when it moves.

The prestressing means 6 furthermore include a body 15 that is thermally deformable according to the temperature, the deformable body 15 exerting the variable force or torque on the movable element 12.

In this example, the thermally deformable body 15 is a bimetallic strip the deformation of which is caused by the temperature. The bimetallic strip has a body extending longitudinally, and comprises two longitudinally associated elongate parts 51, 52. The two elongate parts 51, 52 are each formed from a different material, with thermal deformation properties that are different from each other. Thus, under the effect of heat, the bimetallic strip deforms laterally, one end 55 of the bimetallic strip being held, the other end being able to move and to deform the bimetallic strip to curve it on one side.

The bimetallic strip is disposed perpendicular to the movable element 12, so that a first free part 54 is in contact with the protrusion 53 on the second arm of the L. The held end 55 is held by a second translation table 34 comprising a second movable element 18 and a second pair 17 of parallel flexible blades connecting the second movable element 18 to a third support 19 that is immobile with respect to the plate of the movement. The second movable element 18 is in an L shape, one arm of the L supporting the held end 55 of the bimetallic strip, while the blades of the second pair 17 of blades connect the internal face 56 of the second arm to the third immobile support 19. The blades of the second pair 17 of blades are arranged perpendicular to the bimetallic strip in the idle position of the prestressing means 6.

In the case of a change in temperature, the deformable body 15, here the bimetallic strip, curves or straightens up, so that the first free part 54 exerts a force on the protrusion, and therefore on the first movable element 12, which moves while being guided by the first translation table 33. Thus, by means of the first flexible blade 11, the elastic element 5 receives a force or torque modifying its stiffness and therefore the running of the regulating member 1.

Regulation means, such as a screw, may be added to exert a force 57 on the second movable element 18, in particular at the end of the second arm 58, parallel to the longitudinal axis of the bimetallic strip. Thus, it is possible to adjust the effective length d of the bimetallic strip, to adjust the effect of the prestressing means 6 on the elastic element 5, in particular according to the external parameter, here the temperature. By moving the second movable element 18, guided by the second translation table 34, the free part 54 in contact with the protrusion 53 is modified, and thus the effective length d of the bimetallic strip is increased or decreased.

The second embodiment of a regulating member 10 of FIG. 2 is similar to the first embodiment. The difference lies in the first translation table 33, which is not directly in contact with the movable body 15 and does not carry a protrusion.

The prestressing means 6 also include a spring 21 connecting the first movable element 12 to a movable body 22 comprising a protrusion 53 similar to the first embodiment. The spring 21 provides additional flexibility. The movable body 22 is preferably held between two walls 23 that guide the movement of the movable body 22.

Thus the protrusion 53 is on not the first movable element 12 but on the movable body 22, the first movable body not being in contact directly with the deformable body 15.

Thus, when the bimetallic strip curves or straightens up, it exerts a greater or lesser force on the movable body 22, which moves between the guide walls 23, and transmits a greater or lesser force to the first movable element 12 via the spring 21. For the rest, the operation is the same as for the first embodiment. Thus the elastic element 5 is subjected to a variable force or torque, which modifies the stiffness thereof, and therefore that of the flexible guide 2.

In the third embodiment in FIG. 3, to exert the force or torque on the elastic element 5, the spring part of the prestressing means 6 comprises a first elongate movable element 29, connected to the flexible blade 11 by one end and disposed in line therewith.

A first pair of parallel flexible blades 25 connects the first movable element 29 to a second movable element 28.

The second movable element 28 is connected to the thermally deformable body 15 by a second flexible blade 31, which is substantially parallel to the first movable element 29.

In this embodiment, the thermally deformable body 15 is preferably also a bimetallic strip arranged perpendicular to the second flexible blade 31 and to the first elongate movable element 29. The second flexible blade 31 is connected to the top of the free part of the bimetallic strip, the latter being held by a fixed support 32 at its base.

Thus, when the bimetallic strip curves or straightens up, the second flexible blade 31 transmits a movement to the second movable element 28, which transmits a force to the first elongate movable element 29 through the second pair of parallel flexible blades 25.

In a similar manner to the first embodiment, the temperature variation will cause a modification to the stiffness of the elastic element 5, and therefore to the running of the regulating member.

A third pair of parallel flexible blades 26 connects the second movable element 28 to a third element 27 immobile with respect to the plate of the movement. The third pair of parallel flexible blades 26 and the third movable element 27 are superimposed on the second pair of parallel flexible blades 25 and second movable element 28. The second movable element 28 and the two parallel flexible blades 26 form a translation table, the second movable element 28 being guided in translation with respect to the third immobile element 27 to transmit a movement to the first elongate movable element 29 via the second pair of parallel flexible blades 25. Thus the first elongate movable element 29 transmits a force or the torque to the elastic element 5 through the first flexible blade 11.

Regulation means, such as a screw, may be added to exert a force 49 on the first elongate movable element 29. By increasing the force 49, the movement of the bimetallic strip is transmitted more weakly to the first movable element 29, while by decreasing the force the movement of the bimetallic strip is transmitted more strongly to the first movable element 29. The regulation means make it possible to adjust the sensitivity of the prestressing means 6 according to the temperature.

The invention further relates to a horological movement, not shown on the figures, the movement comprising a regulating member 1, 10, 20 as described previously.

Naturally the invention is not limited to the embodiments described with reference to the figures and variants could be envisaged without departing from the scope of the invention.

In the embodiments described, the flexible blades are preferably straight. Furthermore, the flexible blades of the same type are preferably the same length. The flexible blades may be flexible continuously or have flexible portions only, such as necks.

The invention claimed is:

1. A regulating member for a horological movement comprising an oscillating mass, a flexible guide comprising at least two main flexible blades connecting a movable support to the oscillating mass to enable the oscillating mass to make a rotary movement about a virtual pivot, wherein the regulating member comprises an elastic device for compensating for the temperature arranged so as to connect the movable support to a securing device for securing the regulating member on the horological movement, the elastic compensation device being configured to adapt its stiffness according to the temperature in order to compensate for the effect of temperature on the regulating member.

2. The regulating member according to claim 1, wherein the elastic compensation device comprises an elastic element arranged between the movable support and the securing device, as well as a prestressing device for applying a variable force or torque on the elastic element according to the temperature.

3. The regulating member according to claim 2, wherein the prestressing device comprise a spring part connected to the movable support, the spring part transmitting the force or torque to the elastic element with the movable support, the spring part, the movable support and the elastic element being arranged on the same axis.

4. The regulating member according to claim 3, wherein the prestressing device comprise a body that is deformable according to the temperature, the deformable body being at least partly in contact with the spring part.

5. The regulating member according to claim 4, wherein the regulating member comprises a device for regulating the prestressing device to apply a variable force on the prestressing device.

6. The regulating member according to claim 5, wherein the regulating member comprise a second translation table arranged at one end of the deformable body, the variable force being applied to the second translation table.

7. The regulating member according to claim 4, wherein the deformable body is an elongate bimetallic strip.

8. The regulating member according to claim 3, wherein the spring part comprises a first flexible blade connected to the movable support.

9. The regulating member according to claim 8, wherein the spring part comprises a first translation table connected to the first flexible blade.

10. The regulating member according to claim 9, wherein the deformable body is in contact with the first translation table.

11. The regulating member according to claim 10, wherein the spring part comprises a spring arrange between the deformable body and the first translation table.

12. The regulating member according to claim 9, wherein the first translation table comprises a first movable element connected to the first flexible blade.

13. The regulating member according to claim 8, wherein the elastic part comprises a first movable element connected to the first flexible blade, a second movable element, and a second flexible blade connected to the thermally deformable body, the first movable element and the second movable element being connected by a pair of parallel flexible blades.

14. The regulating member according to claim 13, wherein the elastic part comprises a second flexible blade connected to the thermally deformable body and to the second movable element.

15. The regulating member according to claim 1, wherein the two main blades of the flexible guide are crossed.

16. The regulating member according to claim 1, wherein the regulating member extends substantially in the same plane, except for the oscillating mass.

17. The regulating member according to claim 1, wherein the elastic element comprises a pair of non-crossed blades connecting the movable support to the securing device.

18. A horological movement comprising a regulating member according to claim 1.

* * * * *